June 7, 1938.  E. G. SIMPSON  2,120,156

VEHICLE SEAT

Filed Sept. 7, 1935  5 Sheets-Sheet 1

INVENTOR.
EMORY GLENN SIMPSON
BY
Barnes, Kisselle, Laughlin & Raisch
ATTORNEYS.

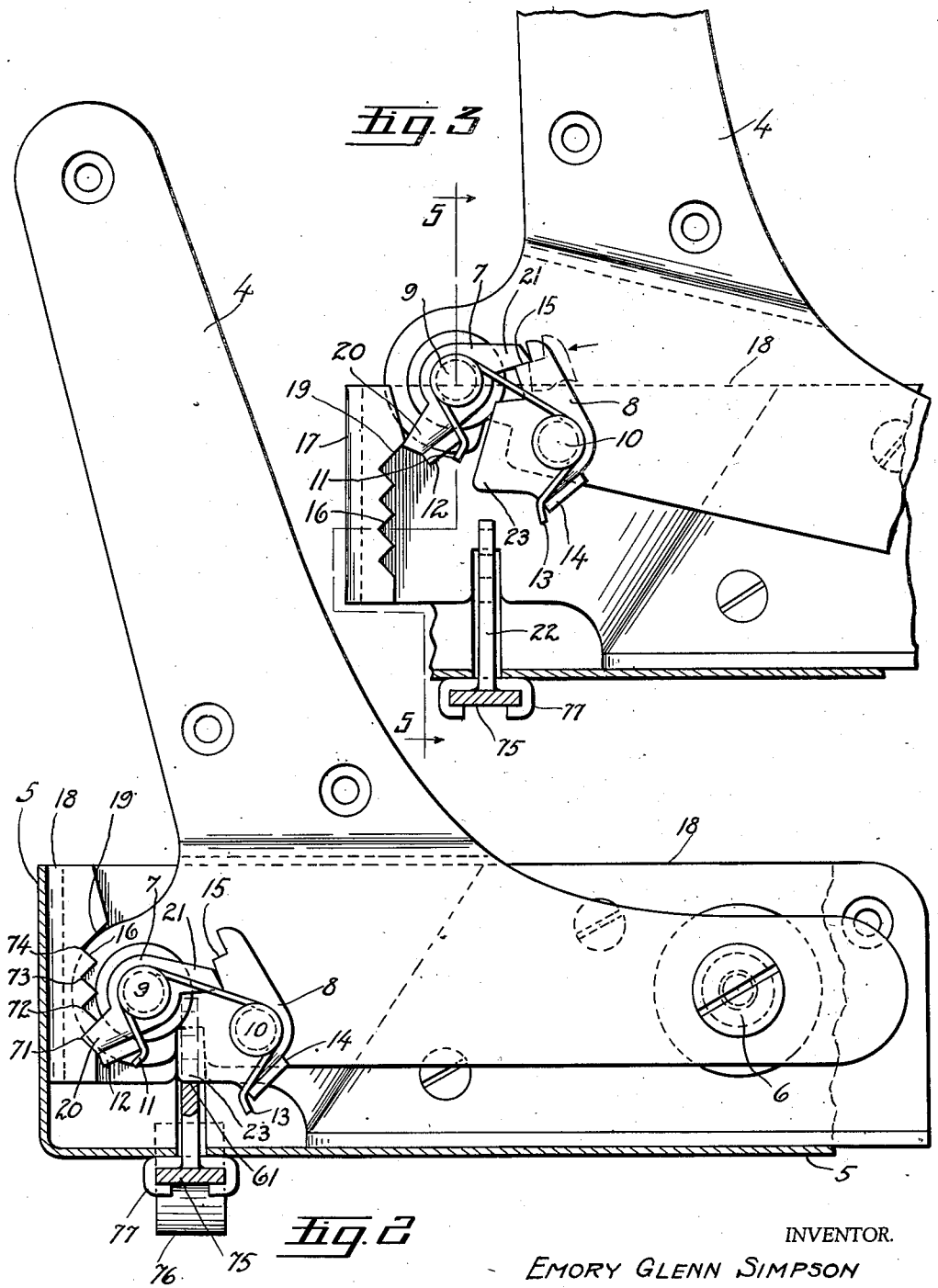

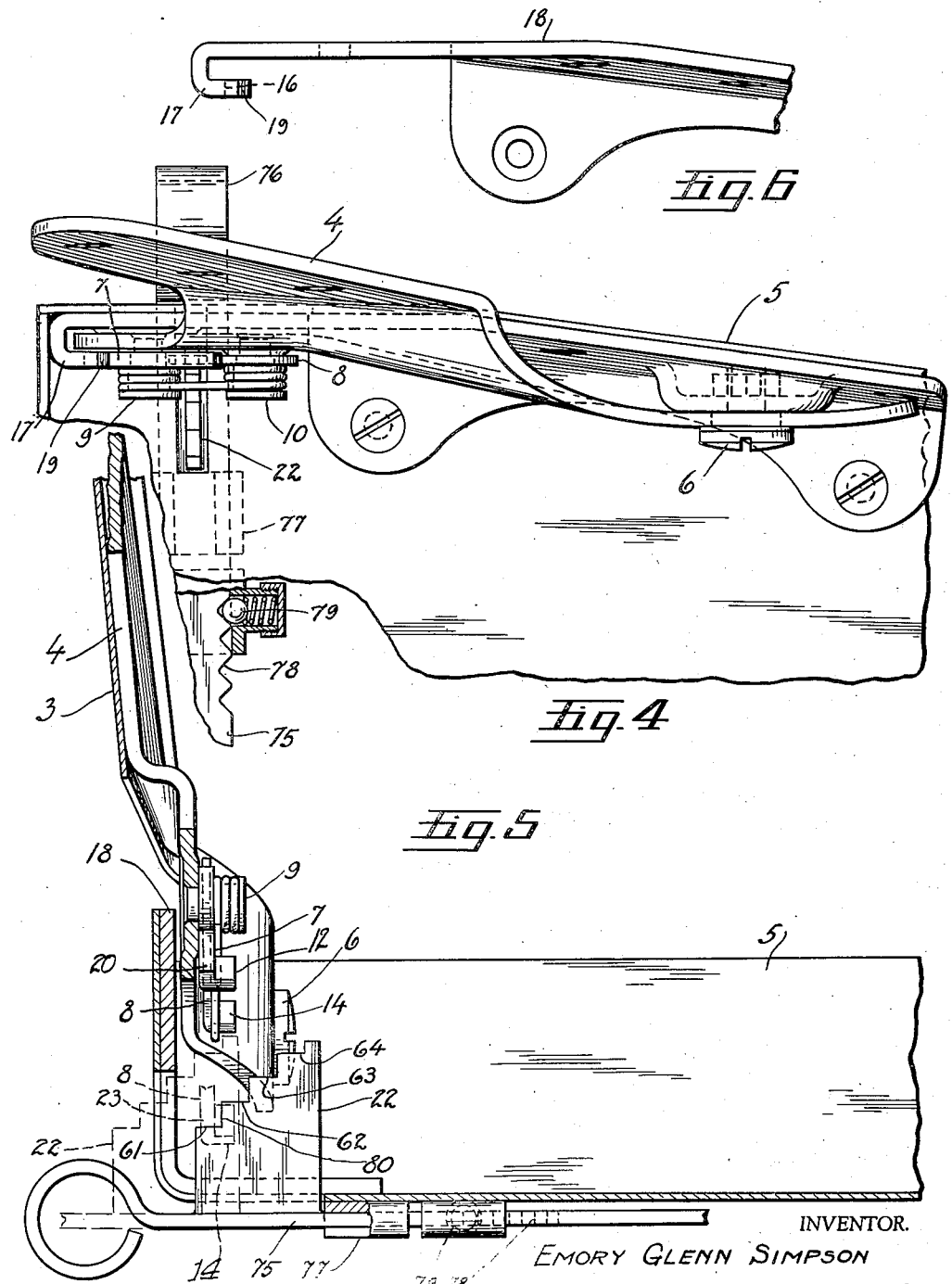

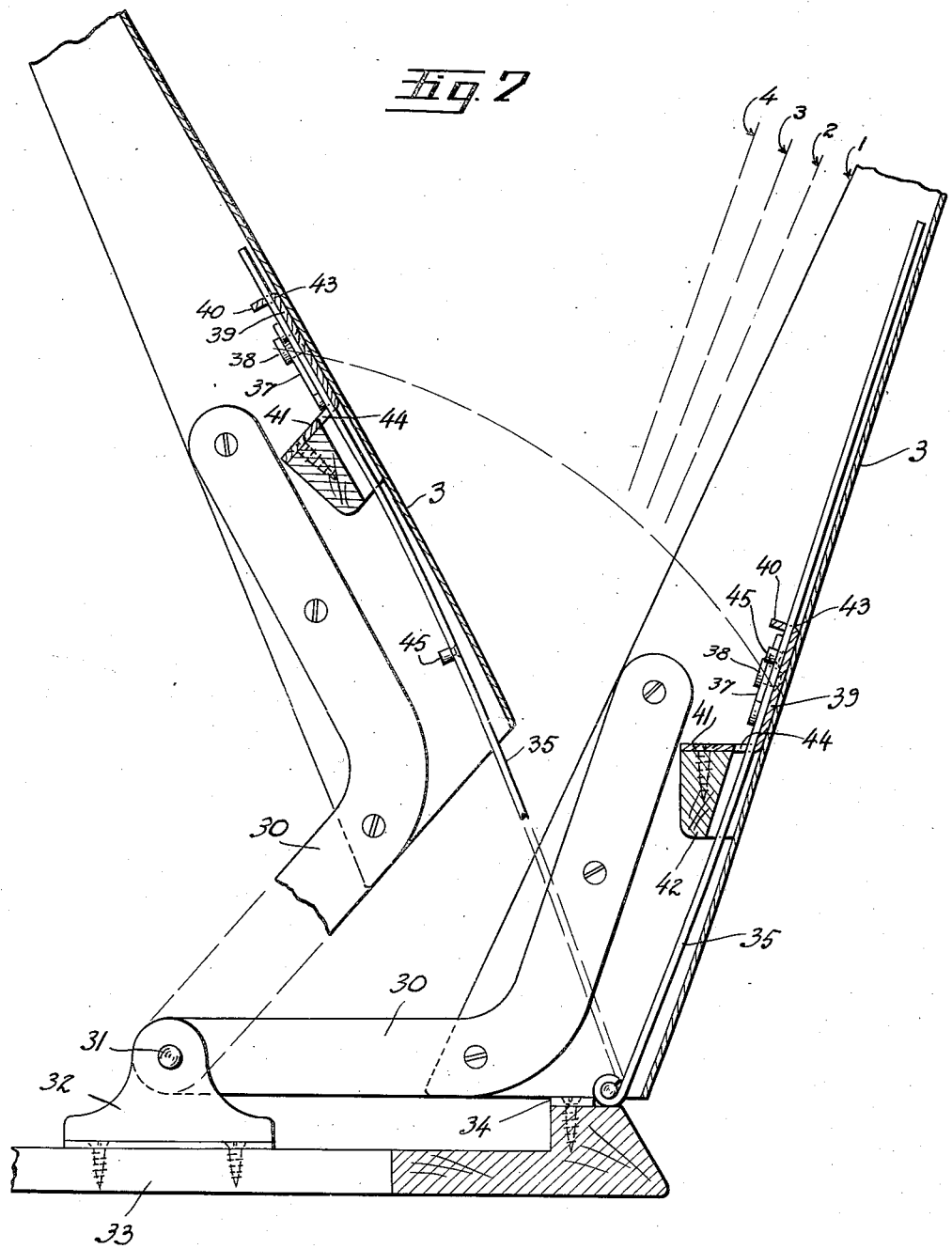

June 7, 1938.  E. G. SIMPSON  2,120,156
VEHICLE SEAT
Filed Sept. 7, 1935   5 Sheets-Sheet 5

INVENTOR.
EMORY GLENN SIMPSON
BY
Barnes, Kisselle, Laughlin & Raisch
ATTORNEYS.

Patented June 7, 1938

2,120,156

UNITED STATES PATENT OFFICE 2,120,156

VEHICLE SEAT

Emory Glenn Simpson, Detroit, Mich., assignor to Ternstedt Manufacturing Company, Detroit, Mich., a corporation of Michigan Application September 7, 1935, Serial No. 39,537

2 Claims. (Cl. 155—162)

This invention relates to a seat for a vehicle and more particularly with a seat for an automotive vehicle having an adjustable back. It is desirable in an automotive vehicle to provide the seat with an adjustable back, and particularly the front vehicle seat back, regardless of whether the seat is a full width sedan seat or an individual coach seat. There are several reasons supporting the desirability of making the seat back adjustable. Among these reasons is the satisfying of the passenger's individual taste as to what inclination of the seat back affords him the greatest personal seating comfort. Thus, one seat by virtue of the adjustability of the seat back, can be adjusted to satisfy the seating tastes of individuals as well as the seating requirements of different individuals.

It is the object of this invention to produce a vehicle seat having an adjustable back which is simply and easily adjusted. This is accomplished by providing the adjustable seat back with an adjusting mechanism that permits the seat back to be adjusted forwardly by merely manually pushing or otherwise moving the seat back forwardly which automatically locks the seat in this adjusted position and which requires no manual or other operation of any additional control or locking device. In other words, the adjusting mechanism is such that it is automatically operated whenever the seat back is moved to the position desired.

In the drawings:

Fig. 2 is a detail of the principal form of the mechanism which automatically latches the seat in position as it is adjusted forwardly.

Fig. 3 is a detail of the seat back latching mechanism showing the same being locked out to permit the return movement of the seat back.

Figs. 4, 5 and 6 are details of the seat back adjusting mechanism, Fig. 5 being a section along the line 5—5 of Fig. 3.

Fig. 7 is a vertical fragmentary section through a modified form of the seat back adjuster.

Figure 8:
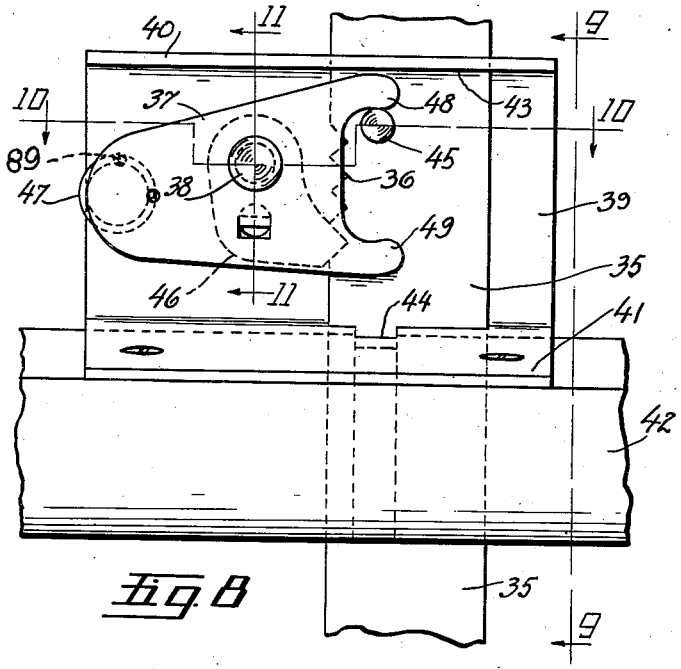
Figs. 8 and 12 are detail views of the modified form of adjusting mechanism.
Figure 10:
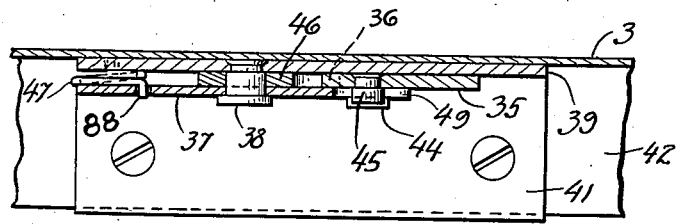
Figure 9:
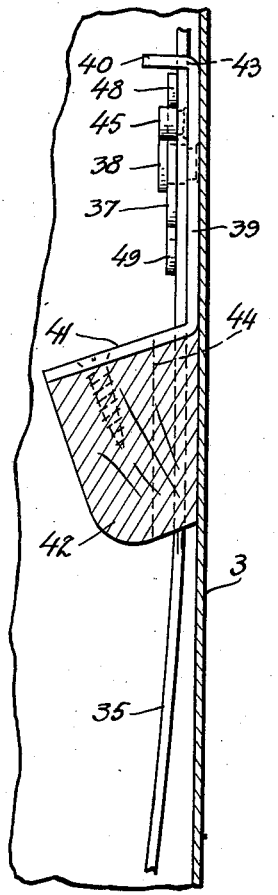
Figure 11:
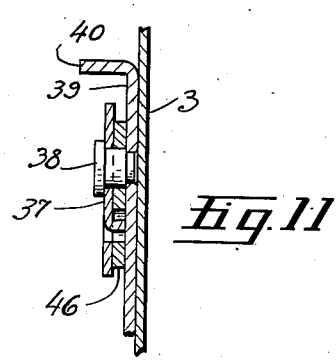

Figs. 9, 10 and 11 are sections along the lines 9—9, 10—10 and 11—11 of Fig. 8.

In the drawings there is shown an automobile body generally designated 1 provided with a front seat comprising a cushion seat bottom 2 and a seat back 3. The seat back 3 may be a full width seat back or a coach seat back. It is also understood that the invention is equally applicable to the rear seat back.

Figure 1:
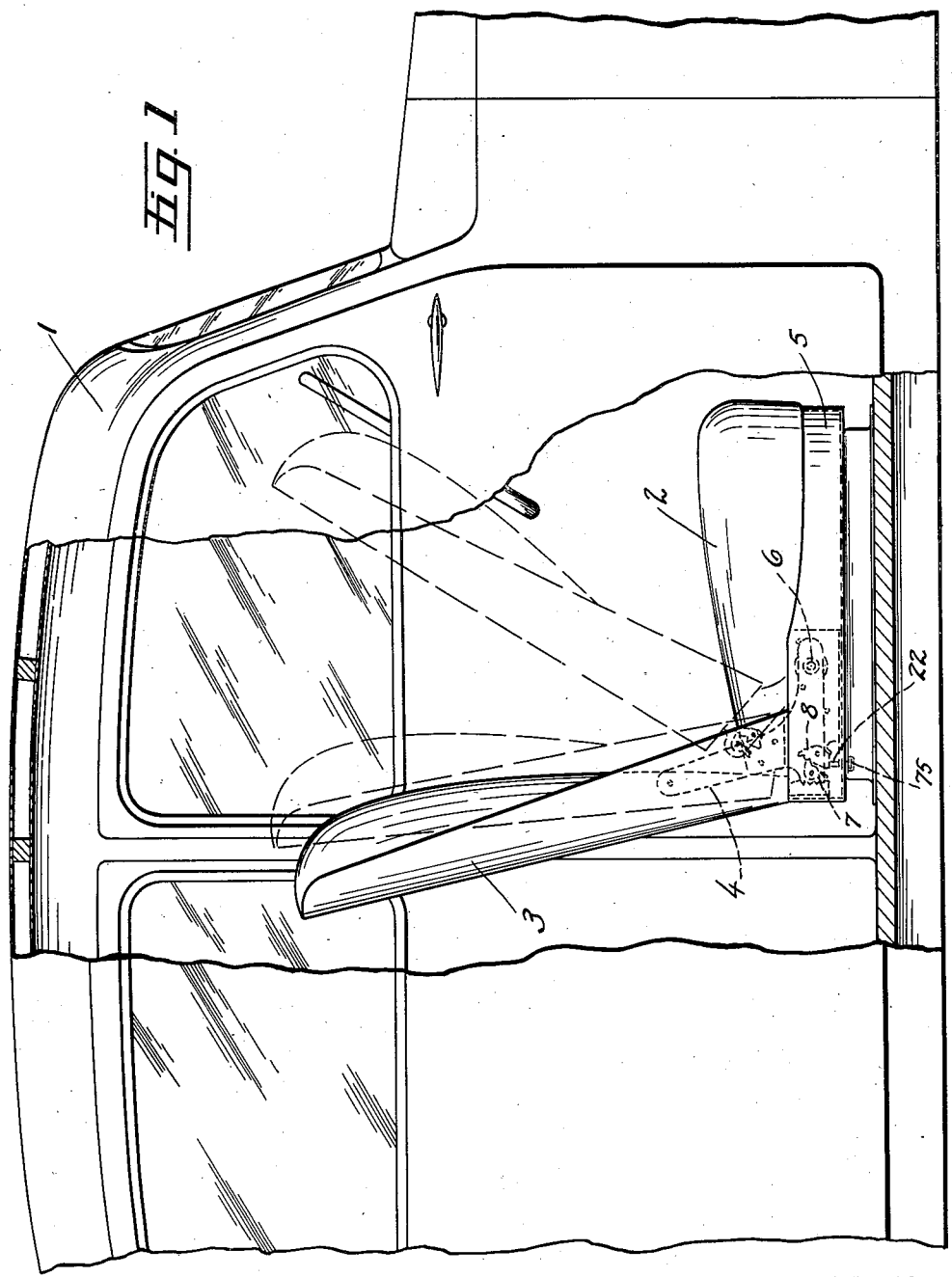
Fig. 1 is a fragmentary side elevation of a vehicle body showing a seat with an adjustable back which is the subject matter of this invention.

To permit adjustment of the seat back the seat back is provided on each side with an L-shaped hinge bracket 4, the one arm of which is secured by screws to the seat back and the other arm of which is pivotally connected by the pin 6 to bracket 18 which is fixed to the frame 5 for the seat bottom cushion 2. Thus the seat back 3 may be swung forwardly about the pivot pin 6 from its rearmost position, shown in the full lines, Fig. 1, to its forwardmost position until the seat back rests upon the seat bottom cushion 2 or strikes the steering wheel.

To permit the seat back 3 to be adjusted forwardly and rearwardly to accommodate the short as well as the tall passengers and also to vary the inclination of the seat back, it is proposed to provide the seat with a ratchet mechanism for dogging the seat back in adjusted position. To this end a cooperating pawl 7 and dog 8 are pivotally mounted upon the heel of the L-shaped hinge bracket 4 by pins 9 and 10 respectively. The pins 9 and 10 also support a spring having a finger 11 which engages behind the lug 12 on the pawl 7 applying a force thereto which tends to rotate the pawl 7 clockwise, as viewed in Fig. 3. This spring also has a finger 13 which engages the lug 14 carried by the dog 8 applying a force to the dog 8 which tends to rotate the same in a counter-clockwise direction. The dog 8 is provided with a shoulder 15 which is arranged to be engaged by the pawl 7 to lock the same in released position as described below.

A rack 16 for co-action with pawl 7 may be conveniently formed by providing a plurality of notches along the vertical edge of the return bent end portion 17 of the bracket member 18. The upper inclined wall of the top notch is elongated to provide a cam surface 19 which extends beyond or forwardly of the apex of any one tooth of the rack 16. By so extending the upper face of the top notch to form a cam surface 19, the cam surface 19 engages the finger 20 of the pawl and rotates the pawl counterclockwise as the seat back 3 is swung forwardly beyond the range of adjustment. As herein shown this range of adjustment comprises four positions, one for each notch of the rack, but this range may be varied by increasing or decreasing the number of notches in the rack. When the pawl 7 is swung counterclockwise by the cam 19, the pawl finger 21 clears the shoulder 15 of the dog 8 and the dog 8 swings clockwise so that the shoulder 15 engages under the finger 21. This locks the pawl 21 in released position, that is, out of engagement with the rack 16, and permits the seat back to be swung rearwardly to its initial position.

When the seat back is returned to its original position, it is desirable to provide means for automatically resetting the pawl 7 in engaged position with rack 16. To this end a dog release member is provided which takes the form of a plate 22 having steps 61, 62, 63, and 64 which correspond to notches 71, 72, 73, and 74 of rack 16. The plate 22 is welded or otherwise fixed to bar 75 provided with a finger piece 76 and slidably supported crosswise of the vehicle body in brackets 77 fixed to the bottom of the seat cushion frame 5. The bar 75 is provided with four notches 78 (corresponding to steps 61, 62, 63 and 64) which cooperate with the coil spring and ball detent 79 to hold the bar 75 in adjusted position. It is, of course, understood that a release member 22 is provided for each of the pawls 7 at opposite sides of the seat.

After the seat back has been swung forwardly to a position where pawl 7 is dogged in released position by the dog 8, as shown in Fig. 3, upon swinging the seat back rearwardly the shoulder 23 of the dog 8 will engage one of the steps 61, 62, 63 or 64, depending upon the position to which the member 22 has been adjusted. For example, assume that the passenger after trying out several positions of adjustment has decided that the inclination of the back will best satisfy his desire as to comfort when the pawl 7 engages in notch 72. As soon as the passenger adjusts the seat with pawl 7 engaged in notch 72 of the rack 16, the bar 75 may be slid outwardly or toward the left as shown in Fig. 5 whereupon step 62 will engage beneath shoulder 23 of dog 8 and the riser 80 between steps 62 and 63 will engage the inner face of the dog 8 and stop further outward movement of member 22. Now, if it is necessary to swing the seat back completely forward so that dog 8 locks pawl 7 in released position out of engagement with rack 16, upon swinging the seat rearwardly, the shoulder 23 of the dog 8 will engage step 62 of release member 22 and thus permit the spring finger 11 to throw the pawl finger 20 in notch 72. This assures return of the seat back to its original position of adjustment prior to being swung completely forward.

As shown in Fig. 2, the seat back is adjusted so that pawl finger 20 engages in notch 71 and the slide 75 has been slid to the left (Figs. 2 and 5) so that step 61 engages beneath shoulder 23 of dog 8. Now if the seat back is swung completely forward, for example, as is often necessary to permit entry and exit of back seat passengers, the dog 8 will dog pawl 7 in released position but as soon as the seat back is swung rearwardly the shoulder 23 of dog 8 (see dotted line showing of dog 8, Fig. 5) will engage step 61 thereby undogging pawl 7 so that finger 20 will again engage notch 71 and insure return of the seat back to the same position of adjustment that it had prior to being swung forwardly.

When the member 22 is adjusted to the dotted line position shown in Fig. 5, the pawl 7 will be released upon return movement of the seat back so that it will engage notch 74.

From the above description it is evident that if the seat back is placed in any preselected position of its four possible positions (71, 72, 73, 74) of adjustment, then swung forwardly beyond the adjusting range and returned, it will always return to its original preselected position of adjustment provided the release member 22 has been slid to the left or right until the step (either 61, 62, 63 or 64) corresponding to the preselected notch (either 71, 72, 73 or 74) is positioned beneath shoulder 23 of dog 8.

In Figs. 7 through 11 there is shown a modified form of ratchet mechanism for holding the seat in adjusted position. In this form of the invention the seat back 3, the same as in the principal form of the invention, has secured thereto at each side an L-shaped hinge bracket 30 which is pivotally mounted as at 31 to a support bracket 32. The support bracket 32 is secured by screws to the seat support 33. The modified form of ratchet mechanism comprises a hinge having one flat leaf 34 which is secured by screws to the support 33 and another flat leaf 35 of spring steel which extends upwardly of the seat back 3 and preferably within the outside trimming. The flat hinge leaf 35 is provided with a plurality of notches 36 which form a rack. This rack is arranged to cooperate with a pawl 37 provided with a pair of projections 48 and 49 which coact with pin 45 to shift the pawl as described below.

The pawl 37 is pivotally mounted on a pin 38 which is fixed to a support plate 39. The support plate 39 is provided with top and bottom flanges 40 and 41 respectively. The seat back 3 is provided with a cross rail 42 which supports the bracket 39. The bracket 39 is secured to the rail 42 by screws. The flanges 40 and 41 have openings 43 and 44 through which the hinge leaf 35 passes and slidably engages the bracket 39.

The hinge leaf 35 has fixed thereto a pin 45. A finger member 46 is fixed to the pawl 37 for interengagement with the rack 36. A snap over center coil spring 47 is mounted between the pawl 37 and the plate 39. One end 88 of the spring engages in an opening in the pawl 37 and the other end 89 engages in an opening in the base of the support bracket 39. This snap over center spring 47 yieldably retains the pawl 37 in one or the other of its extreme pivoted positions.

Figure 12:
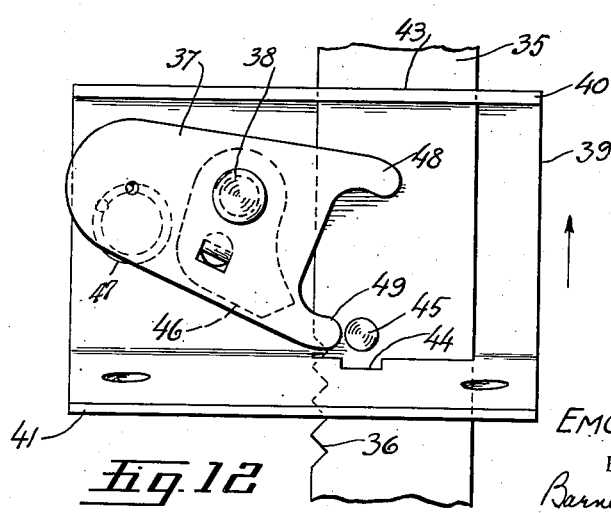

The operation of the modified form of the device is as follows. When the seat back is in the rearmost position shown in the full lines, Fig. 7, the finger 46 of the pawl interengages the lowermost notch in the rack 36 and the coil spring 47 yieldably urges the pawl 37 in a counterclockwise direction as shown in Fig. 8. If the seat back 3 is now swung slightly forward, the hinge leaf 35 will swing about its pivot and the pawl finger 46 will ride upwardly out of the lowermost notch of the rack into the next notch above it. As the finger 46 rides upwardly of the leaf 35 from one notch into another, coil spring 47 is not thrown over center but yieldably holds the pawl finger in engagement with the rack. When the seat back is swung forwardly a sufficient distance so that the pawl finger 46 passes out of the uppermost notch of the rack 36, then the pin 45 on the hinge leaf 35 is engaged by the lowermost projection 49 and cams the pawl 37 clockwise over center to the position shown in Fig. 12. Pawl 37 is held in this over center position by the spring 47. This permits the back 3 to be thrown completely forward, the pin 45 passing through the opening 44 as shown in Figs. 10 and 12.

When the seat back is now thrown rearwardly the support plate 39 and pawl 37 ride downwardly along the hinge leaf 35 until the pin 45 is engaged by the upper projection 48 on the pawl 37, swinging the pawl 37 counterclockwise to over center position and the finger 46 into engagement with the lowermost notch of the rack 36 as shown in Fig. 8. The seat back is now in its rearmost position shown in the full lines, Fig. 7, and may again be adjusted forwardly as above described. With this modified form of seat back adjusting mechanism preferably only one adjuster is necessary and is located midway between the ends of the seat back.

I claim:

1. In a vehicle seat having a seat bottom and support therefor, a seat back pivotally mounted on the said support to swing forwardly and rearwardly above the seat bottom, seat adjuster mechanism comprising cooperating rack and pawl members, one of which is pivotally mounted on the seat back and the other of which is pivotally mounted on the seat support, the said pawl interengaging the rack member when the seat back is swung through a predetermined range to lock the seat against rearward movement in any one of a plurality of positions of adjustment, cooperating means carried by the said pawl and rack members arranged to engage when the seat back is thrown forwardly beyond the said predetermined range of adjustment to throw the pawl out of engagement with the said rack whereby said seat back may be swung rearwardly through the said predetermined range of adjustment, and a snap over center spring connected to said pawl and its support for yieldably holding the said pawl disengaged from the said rack.

2. In a vehicle seat having a seat bottom and support therefor, a seat back pivotally mounted on the said support to swing forwardly and rearwardly above the seat bottom, seat adjuster mechanism comprising cooperating rack and pawl members, one of which is pivotally mounted on the seat back and the other of which is pivotally mounted on the seat support, the said pawl interengaging the rack member when the seat back is swung through a predetermined range to lock the seat back against rearward movement in any one of a plurality of positions of adjustment, a snap over center spring connected to said pawl and its support for yieldably holding the pawl on one side of center in interengaged relation with the rack and for holding the pawl on the other side of center out of engagement with the said rack, a pin carried by the said rack member arranged to engage means on the said pawl when the seat back is swung forwardly beyond the predetermined range of adjustment to disengage the pawl from the rack and arranged to engage means on the pawl when the seat back is swung rearwardly through the said predetermined range of adjustment to reengage the pawl with the said rack.

EMORY GLENN SIMPSON.